(12) United States Patent
Scott (10) Patent No.: US 6,330,987 B1
(45) Date of Patent: *Dec. 18, 2001

(54) APPARATUS AND METHODS FOR IN-SPACE SATELLITE OPERATIONS

(76) Inventor: David R. Scott, 6033 W. Century Blvd., Suite 400, Los Angeles, CA (US) 90045

( * ) Notice: Subject to any disclaimer, the term of this patent is extended or adjusted under 35 U.S.C. 154(b) by 0 days.

This patent is subject to a terminal disclaimer.

(21) Appl. No.: 09/489,140

(22) Filed: Jan. 21, 2000

Related U.S. Application Data (63) Continuation of application No. 09/146,161, filed on Aug. 2, 1998, now Pat. No. 6,017,000, which is a division of application No. 08/700,712, filed as application No. PCT/US95/15103 on Nov. 13, 1995, now Pat. No. 5,806,802, said application No. 09/146,161, is a continuation-in-part of application No.PCT/US94/13052, filed on Nov. 14, 1994, and a continuation-in-part of application No. 08/152,459, filed on Nov. 12, 1993, now Pat. No. 5,511,748.

(51) Int. Cl.$^7$ ...................................................... B64G 1/00
(52) U.S. Cl. ..................... 244/158 R; 244/164; 244/169; 244/172
(58) Field of Search ............................... 244/158 R, 161, 244/164, 169, 172

(56) References Cited

U.S. PATENT DOCUMENTS

| | | | |
|---|---|---|---|
| 5,511,748 | * | 4/1996 | Scott ..................................... 244/161 |
| 5,806,802 | * | 9/1998 | Scott ..................................... 244/161 |
| 6,017,000 | * | 1/2000 | Scott ................................ 244/158 R |

* cited by examiner

*Primary Examiner*—J. Woodrow Eldred
(74) *Attorney, Agent, or Firm*—Drummond & Duckworth (57) ABSTRACT

Apparatus and methods for performing satellite proximity operations such as inspection, recovery and life extension of a target satellite through operation of a "Satellite Inspection Recovery and Extension" ("SIRE") spacecraft which can be operated in the following modes (teleoperated, automatic, and autonomous). The SIRE concept further consists of those methods and techniques used to perform certain (on-orbit) operations including, but not limited to, the inspection, servicing, recovery, and lifetime extension of satellites, spacecraft, space systems, space platforms, and other vehicles and objects in space, collectively defined as "target satellites". The three basic types of SIRE proximity missions are defined as "Lifetime Extension", "Recovery", and "Utility". A remote cockpit system is provided to permit human control of the SIRE spacecraft during proximity operations.

5 Claims, 8 Drawing Sheets

APPARATUS AND METHODS FOR IN-SPACE SATELLITE OPERATIONS

RELATED APPLICATIONS

This application is a continuation of my pending U.S. application Ser. No. 09/146,161, filed Aug. 2, 1998 now U.S. Pat. No. 6,017,000, which is a divisional application of U.S. application Ser. No. 08/700,712, filed Jul. 12, 1996, now U.S. Pat. No. 5,806,802, which is a national phase application of PCT International Application Number PCT/US95/15103, filed Nov. 13, 1995, which is, in-turn, a continuation-in part of PCT International Application Number PCT/US94/13052, filed Nov. 14, 1994, which is, in-turn, a continuation-in-part of my U.S. application Ser. No. 08/152,459, filed Nov. 12, 1993, now U.S. Pat. No. 5,511,748.

BACKGROUND OF THE INVENTION

This invention pertains to apparatus and methods for in-space satellite operations, such as modifying the useful life of a space satellite, inspecting it, adjusting its space trajectory, and the like.

More particularly, the invention relates to such apparatus and methods for extending or otherwise modifying the useful operational lifetime of satellites which perform communications, weather reconnaissance, space reconnaissance and similar functions.

In another respect, the invention pertains to such apparatus and methods for extending the useful life of such satellites without performing complicated in-space refueling or repair functions.

According to still another aspect, the invention pertains to apparatus and methods for effecting planned deorbit and reentry of a satellite or reboosting a spent satellite to a higher orbit or another trajectory, to delay deorbit or to place a satellite in a parking or other operational or non-operational orbit or trajectory. Similarly, the invention relates to effecting the deorbit or altering the trajectory of debris in space to avoid collisions with other spacecraft.

In yet another aspect, the invention pertains to apparatus and methods for performing a variety of proximity operations, e.g., inspection of an operational or non-operational satellite, to determine its status, etc.

In still another aspect, the invention pertains to apparatus and methods for delivering or replenishing supplies to orbiting spacecraft such as the planned International Space Station.

Because of the high reliability of contemporary electronics, the end-of-life (EOL) of most satellites is caused by on board propellant depletion and the corresponding loss of attitude and position control, i.e., for orientation, pointing, including stabilization, and orbit control. The previous proposed approach to extending EOL is to replenish the propellant in the satellite tanks by refueling from another spacecraft. Alternatively, mechanical attachment of additional external propellant tanks to the target satellite would also accomplish this objective.

In addition to EOL by normal propellant depletion, there have been numerous instances in which satellites have been initially delivered to unacceptable orbits. These orbits have been corrected by additional propulsion maneuvers. However, use of the satellites' onboard propellant to move it to an acceptable orbit resulted in a corresponding reduction in the useful life of the satellite. In some instances, initial orbit correction was impossible because it would have completely depleted the satellite's onboard propellant supply.

In the past, considerable effort has been expended to develop in-space refueling technology. However, this has required extensive and expensive modifications to conventional satellites, risky proximity operations, possible contamination of the satellite by escaping fuel and other practical problems.

Conversely, when extension of the operating life of a satellite cannot be effected for various reasons, e.g., other malfunctions of a satellite or its equipment which cannot be repaired or obsolescence of the satellite, it would be desirable to be able to effect pre-planned deorbit and reentry. In this way, the inoperable or obsolescent satellite will not continue to clutter the available space for working satellites and reduce the likelihood of collision with other satellites or space vehicles. If the deorbit and reentry can be preplanned, these techniques will also reduce the possibility of reentry into populated areas with possible disastrous results. Furthermore, even if planned deorbit and reentry is not necessary or if it would be desirable to otherwise change the space trajectory of a satellite, it would be desirable to provide apparatus and methods for changing the space trajectory of a satellite to another operational or non-operational trajectory or for reboosting satellites which are cluttering useful orbits or which are about to deorbit, into less cluttered and less dangerous parking orbits.

SUMMARY OF THE INVENTION

The principal object of the present invention is to provide apparatus and methods for in-space satellite operations, such as, for example, extending or otherwise modifying the useful life of a space satellite, modifying its space trajectory, etc.

Yet another object of the invention is to provide such extension of the useful life of a space satellite by a simplified method and using simplified apparatus in comparison to prior art techniques which involve refueling the space satellite.

Still another object of the invention is to provide apparatus and methods which permit planned deorbit and reentry of spent or obsolete satellites, which permit changing the space trajectory of a satellite to another operational or non-operational trajectory or which permit reboosting spent or obsolete satellites to a parking orbit.

These, other and further objects and advantages of the invention will be apparent to those skilled in the art from the following detailed description thereof, taken in conjunction with the drawings.

DETAILED DESCRIPTION OF THE PREFERRED EMBODIMENTS

As used herein the term "adjusting the life of a target satellite" means either extending the useful life of a target satellite, which is normally limited by the availability of onboard propellant for position control, or terminating the orbiting activity of a spent or obsolete satellite by planned deorbit and reentry or by transferring a satellite from its previous orbit another trajectory or to a parking orbit.

As used herein the term "controlling the position of the docked satellite-spacecraft combination" includes both controlling the trajectory of the docked combination relative to the earth and/or controlling the attitude of the docked combination relative to the earth or to the star field.

Briefly, in accordance with one embodiment of the invention, I provide apparatus and methods for performing satellite proximity operations such as inspection, recovery and life extension of a target satellite through operation of a "Satellite Inspection Recovery and Extension" ("SIRE") spacecraft which can be operated in the following modes (teleoperated, automatic, and autonomous). The SIRE concept further consists of those methods and techniques used to perform certain (on-orbit) operations including, but not limited to, the inspection, servicing, recovery, and lifetime extension of satellites, spacecraft, space systems, space platforms, and other vehicles and objects in space, collectively defined as "target satellites".

The three basic types of SIRE proximity missions are defined as "Lifetime Extension", "Recovery", and "Utility". Each type of mission is further separated into additional categories depending on more specific technical and operational requirements. For example, the objective of the Lifetime Extension Mission is to provide additional stationkeeping propellant for satellites that are approaching their projected end life (EOL) due to onboard propellant depletion but which are otherwise fully functional. The Lifetime Extension Mission thus enables the fully functional satellite to remain operational in its desired (revenue producing) orbit for an extended period beyond its projected end of life by forming a docked SIRE satellite-spacecraft combination.

To perform the Life Extension Mission, the SIRE spacecraft includes guidance, navigation and control systems, an onboard propellant supply and docking means for mechanically connecting the target satellite and the SIRE spacecraft to form the docked satellite-spacecraft combination. Preferably, the propulsion system is hypergolic consisting of mono-methylhydrazine and $N_2O_4$ for proximity operations. The guidance, navigation and control systems of the SIRE spacecraft provide the means for controlling the position of the docked satellite-spacecraft combination. The onboard propellant supply is sufficient to provide for rendezvous and docking of the SIRE spacecraft with the target satellite and for position control of the docked satellite-spacecraft combination.

In accordance with another embodiment of the invention, I provide a method for adjusting the life of a target satellite. The method of the invention comprises the steps of mechanically connecting a SIRE spacecraft to the target satellite, forming a docked satellite-spacecraft combination and activating the guidance, navigation and control systems of the SIRE spacecraft to provide position control for the docked satellite-spacecraft combination. The SIRE spacecraft used in this method includes onboard propellant supply for position control of the docked satellite-spacecraft, after docking. By having the SIRE spacecraft perform all stationkeeping functions such as position and attitude control, the satellite may perform its designed functions, such as telecommunications and weather mapping, long after its original projected end of life.

The objective of the "Recovery Mission" is to correct various anomalies encountered by orbiting satellites. These anomalies include incorrect launch orbit, orbital decay, loss of satellite function capability, and satellite system failure. To correct incorrect launch orbit or orbital decay, the SIRE spacecraft is similar in construction to the spacecraft utilized for Lifetime Extension Missions. The "recovery" SIRE spacecraft includes guidance, navigation and control systems, an onboard propellant supply and docking means for mechanically connecting the target satellite and the SIRE spacecraft to form the docked satellite-spacecraft combination. The guidance, navigation and control systems of the SIRE spacecraft provide the means for controlling the position of the docked satellite-spacecraft combination. The onboard propellant supply is sufficient to provide for rendezvous and docking of the spacecraft with the satellite and for subsequently transferring the satellite to another orbit or effecting reentry of the spacecraft-satellite combination.

Where the target satellite has suffered a loss of capability such as non-deployed antenna or solar array, the SIRE spacecraft includes additional apparatus for effecting repair of refurbishment, or for effecting return of the spacecraft to Earth (Shuttle). In a preferred embodiment, the SIRE spacecraft includes docking means for effecting the docked spacecraft-satellite combination and intervention tools for effecting repair and/or refurbishment of the target satellite. The intervention tools, by way of example, include means for removing and replacing sections of the satellite such as spacecraft thermal blankets, means for severing restraint cables that prevent deployment of the antenna or solar array and means for deploying stuck mechanisms. More particularly, by way of example these intervention tools may include, a satellite capture bar such as the "Stinger" designed by NASA, one or more robotic arms similar to a smaller version of the Remote Manipulator System (RMS) found on the Space Shuttle, a satellite closeup inspection tool such as a remotely operated camera, a two-finger gripper, a cable/pin/bolt cutter and a lever force tool.

Alternatively, for certain system (subsystem, component) failures, the Recovery Mission provides the target satellite with a substitute or supplemental system to "recover" the satellite to it designated operational capability including redundancy. For example, Anik E-1 and Anik E-2, which are three-axis stabilized spacecraft designed to provide television coverage for Western Europe, have both suffered failures of their primary momentum wheels. Similarly, several additional spacecraft have also encountered anomalies with their momentum wheels indicating possible premature failures. The docking of a SIRE spacecraft equipped with supplemental momentum wheels to the target satellite would provide the necessary stabilization to enable the satellite to remain operational for its projected end of life.

The objective of the "Utility Missions" include all other SIRE in-space maintenance missions such as in-space inspection of satellites and other space vehicles and objects, environmental protection and collision avoidance (debris control), and resupply of orbiting satellites such as the planned International Space Station Alpha (ISSA). An additional Utility Mission would entail the planned "decommissioning" of an orbiting spacecraft. Under certain circumstances, such as military applications, it would be desirable to deactivate a satellite. In a preferred embodiment, the SIRE spacecraft includes a liquid contaminant that is ejected through nozzles or the like from the SIRE spacecraft to contact the target satellite. Ideally, the contaminant degrades system performance of the target satellite to eventually effect complete failure of the target satellite. A unique feature of the SIRE spacecraft is the hypergolic propulsion system used for rendezvous. The spraying of this propellant (mono methylhydrazine and $N_2O_4$) on a target satellite would cause contamination of the spacecraft systems, e.g. rapid deterioration of the solar cells or telecommunication disks, to effect the degradation and eventual failure of the target satellite.

Figure 1:
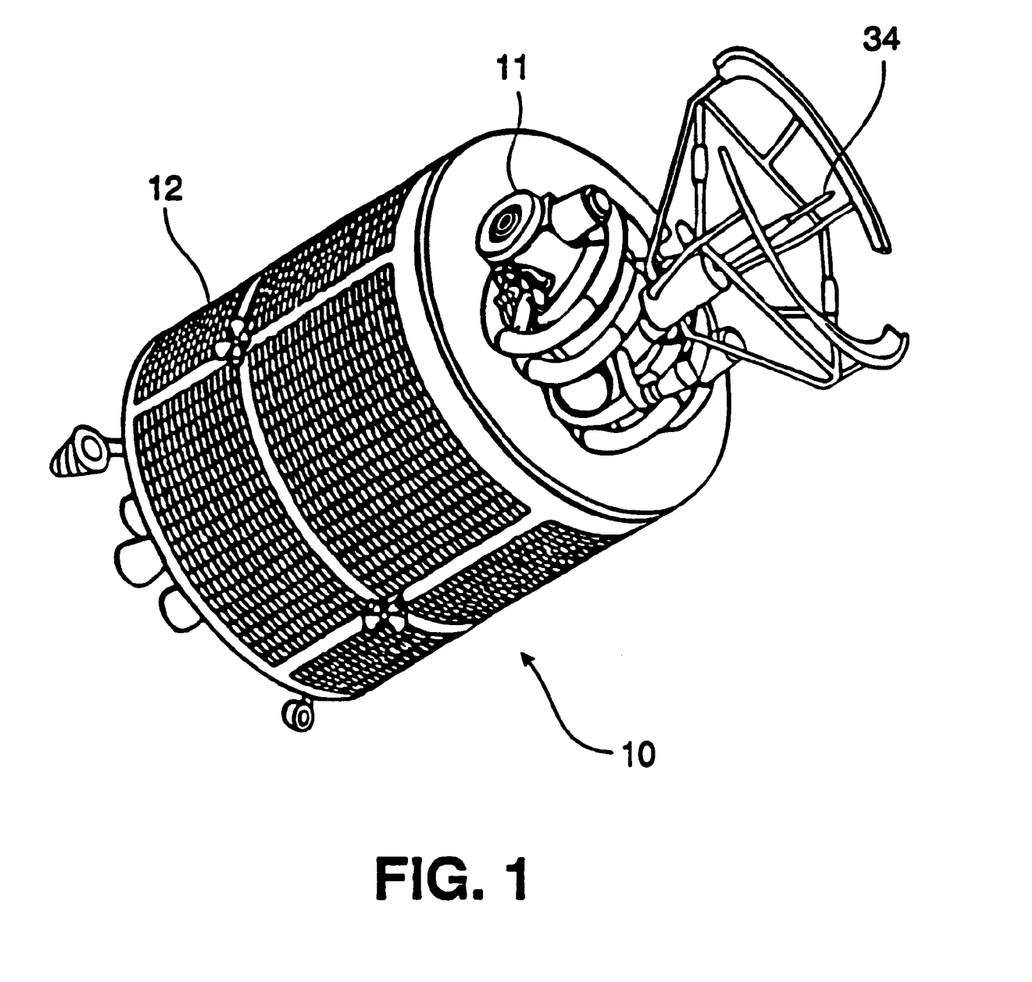
FIG. 1 is a perspective view of an extension spacecraft, configured in accordance with a presently preferred embodiment of the invention.
Figure 2:
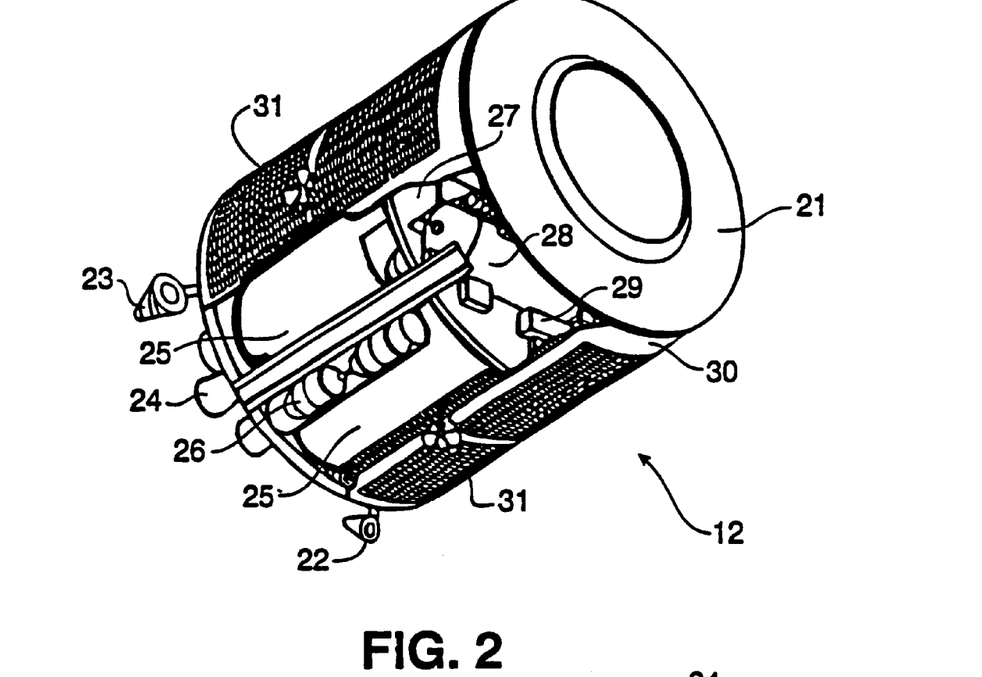
FIG. 2 is a partially cut-away perspective view of the service module of the extension spacecraft of FIG. 1.
Figure 3:
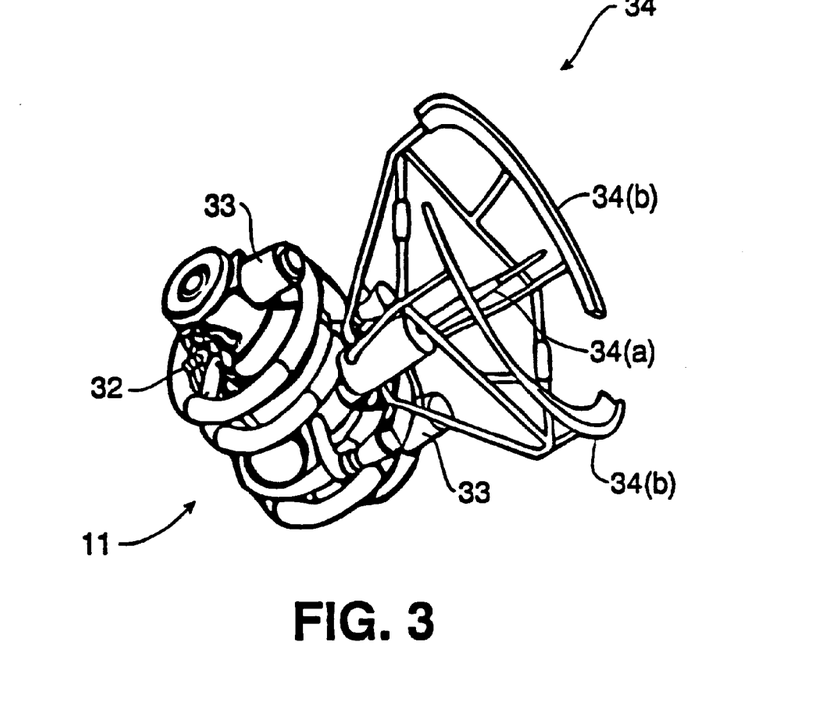
FIG. 3 is a perspective view of the command module of the extension spacecraft of FIG. 1.
Figure 4A:
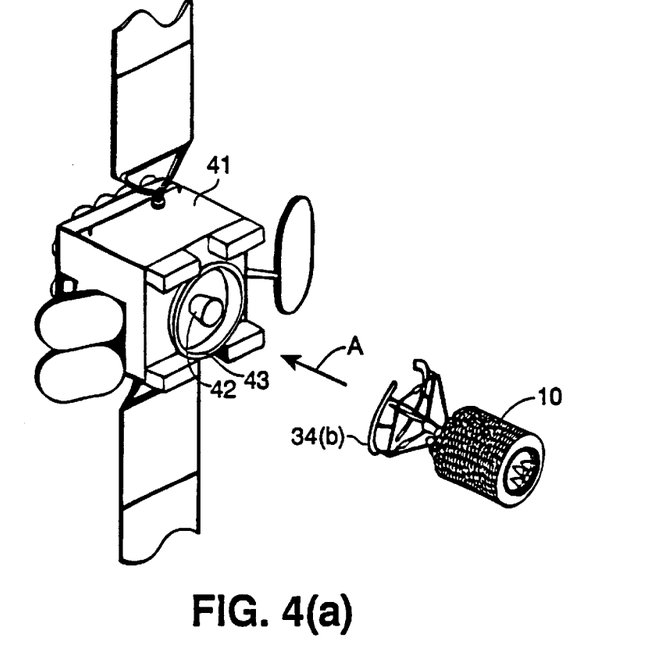
FIG. 4 illustrates the docking maneuvers and mechanical interconnection of the extension spacecraft of FIGS. 1–3 with a target satellite.
Figure 4B:
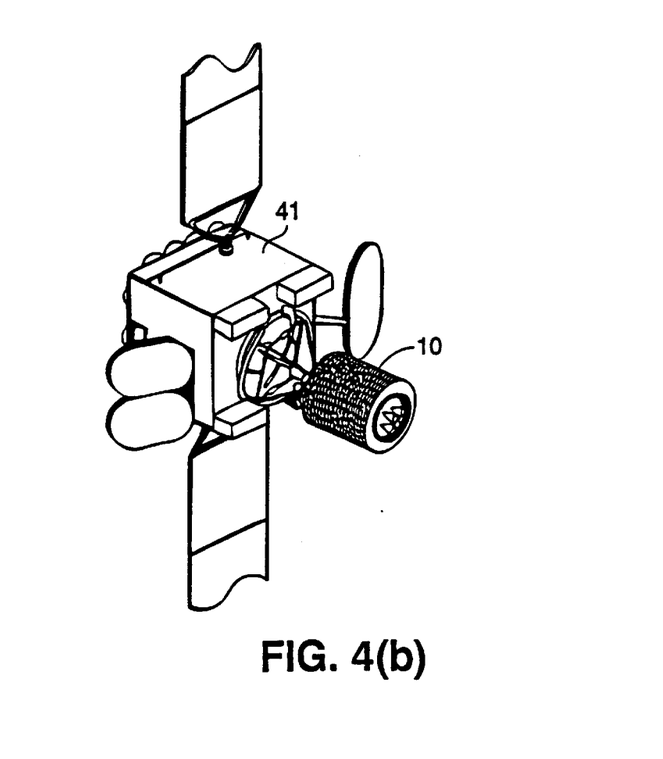

Turning now to the drawings, FIGS. 1–3 illustrate a SIRE spacecraft constructed in accordance with and used in accordance with the principles of the present invention. The spacecraft 10 comprises a command module 11 and a service module 12. The SIRE satellite embodies exoatmospheric construction and is adapted to be carried into space, e.g., to a rendezvous phasing orbit or low Earth orbit in the enclosed cargo bay or within the enclosing shroud of an earth launch vehicle (ELV) such as, for example, the Taurus or the Space Shuttle, depending on mission requirements, availability, cost, etc. For example, in one embodiment of the invention, the baseline earth launch vehicle is the Delta 7920, which has a low earth orbit payload insertion capability of approximately 5,000 kilograms and a geosychronous transfer orbit capability of approximately 1,300 kilograms.

The service module 12 operates as a "space bus" for the command module 11, providing among other functions, propulsion, power and communications support, thus minimizing the requirements for corresponding subsystems in the command module 11. The operations phase design lifetime of the command module 11 for in-space servicing can therefore be relatively short, based on specific programmed tasks at the target vehicle during a fixed period of activity. For certain missions, the command module 11 will separate from the service module 12 and operate independently. Also, for certain missions, a space transfer vehicle (STV), such as that disclosed in my issued U.S. Pat. No. 5,242,135, can be employed to transfer the SIRE spacecraft 10 from the launch insertion orbit to a rendezvous phasing orbit (RPO).

As will be apparent to those skilled in the art, all of the functions of the command module 11 could be incorporated into the service module 12, although the separate command and service modules herein described provide for maximum mission flexibility and are, accordingly, a presently preferred embodiment of the invention.

Referring more particularly to FIG. 2, the primary purpose of the service module 12 is to augment the propulsion capabilities of the command module 11. For example, if the command module 11 is configured as a variant of the SDIO Lightweight Exoatmospheric Projectile (LEAP) Vehicle, the service module 12 can be based on the design of the existing "Small Altimeter" (SALT) satellite manufactured for the United States Navy by Intraspace, Inc., North Salt Lake City, Utah. The service module 12 includes a command module adapter ring 21, GPS antenna 22, S-Band OMNI antenna 23, orbit insertion motors 24, propellant tanks 25, batteries, 26. Mounted on the mid-deck 27 is a reaction control system 28 and on-board processor 29. These components are enclosed by a monocoque structure 30, on which are mounted solar power cell arrays 31.

The service module 12 is sized to perform all rendezvous and proximity maneuvers, as well as specific transfer maneuvers required for the SIRE spacecraft-target satellite docked combination. For certain target spacecraft locations, the energy requirements to position the SIRE spacecraft for rendezvous may be greater than that available from the service module 12, for example, an inclination change for the target satellite. In such cases, the STV would be added to the SIRE spacecraft 10 to augment the propulsion capabilities of the service module 12.

For major maneuvers, the service module 12 is equipped with a storable biopropellant system consisting of a "quad" array of four uprated Marquardt R-4-D 490 Newton (100 lb.) thrust axial engines. This configuration provides adequate thrust-to-weight ratio to minimize the effects of non-impulsive maneuvers, as well as redundancy for engine-out capability to complete the mission. Marquardt R-4-D engines are selected for their very high reliability, high Isp (322 seconds), maturity (over 800 produced) and availability.

To prevent contamination of the target satellite when the SIRE spacecraft is stationkeeping, the SIRE spacecraft attitude control system is a nitrogen cold gas system consisting of 16×5 lb. thrusters mounted in quads on the circumference of the service module 12. This configuration enables both three-axis rotation and three-axis translation for example, for stationkeeping and docking.

Referring more specifically to FIG. 3, the command module 11 includes several major subsystems, including guidance, navigation and control (GNC) system used for all SIRE spacecraft operations, a main propulsion system with "divert" thrusters of approximately 100 lbs. (490 N) thrust each, an attitude control system, and data and communication subsystems. The command module payload consists of a "seeker" subsystem with sensors for target location, tracking and inspection, and a docking system with various servicing devices such as a docking apparatus or robotic arms with clamps or grippers.

The basic configuration of the command module 11 is defined as a completely independent vehicle to enhance mission planning flexibility, minimize interface requirements, maximize the use of existing or developmental small spacecraft, and enable independent testing and verification of certain proximity operations and hardware in ground facilities prior to launch. The command module 11 may remain attached to the service module 12 (as for the UHF-1 recovery mission, described below), or it may be detached to operate autonomously. The service module 12 could, therefore, carry two or more command modules 11. In such configuration, the service module 12 acts as the primary spacescraft and the command module or modules can be detached fore use as observation spacecraft. In either case, prior to separation of the command module(s) 11, certain rendezvous braking maneuvers would be performed by the divert thrusters of the combined command module-service module.

The baseline design command module 11 consists of a variant of the SDIO LEAP with minor modifications. The Rocketdyne AHIT Vehicle is selected as the baseline command module 11. This vehicle has completed several full-up hover tests in the SDIO National Hover Test Facility. In current configuration it weighs 10.2 kilograms, including 1.7 kilograms of propellant. It produces a delta velocity increment of 357 m/sec.

In this configuration, the command module includes cold gas attitude control system thrusters 32 and two divert thrusters 33 which have significantly higher thrust (490 N 100 lb.) than the service module engines (5 lb.). These divert thrusters 33 are aligned along the line of sight from the service module 12 toward the target satellite. These divert thrusters 33 would not be used in close proximity to the target satellite to preclude contamination of the satellite. The remaining two divert thrusters of the AHIT vehicle are removed.

This forward alignment of the divert thrusters enables the seeker assembly to be continuously oriented toward the target satellite, thus precluding the necessity of rotating the SIRE spacecraft 180 degrees opposite to the target line of site to perform braking maneuvers. Although the engines 24 of the service module 12 could be used to perform braking, the low thrust level of these engines (20 lbs. total) would result in much longer burn times and very narrow margins in ignition time, burn durations, orbital position, and relative velocity.

Figure 5:
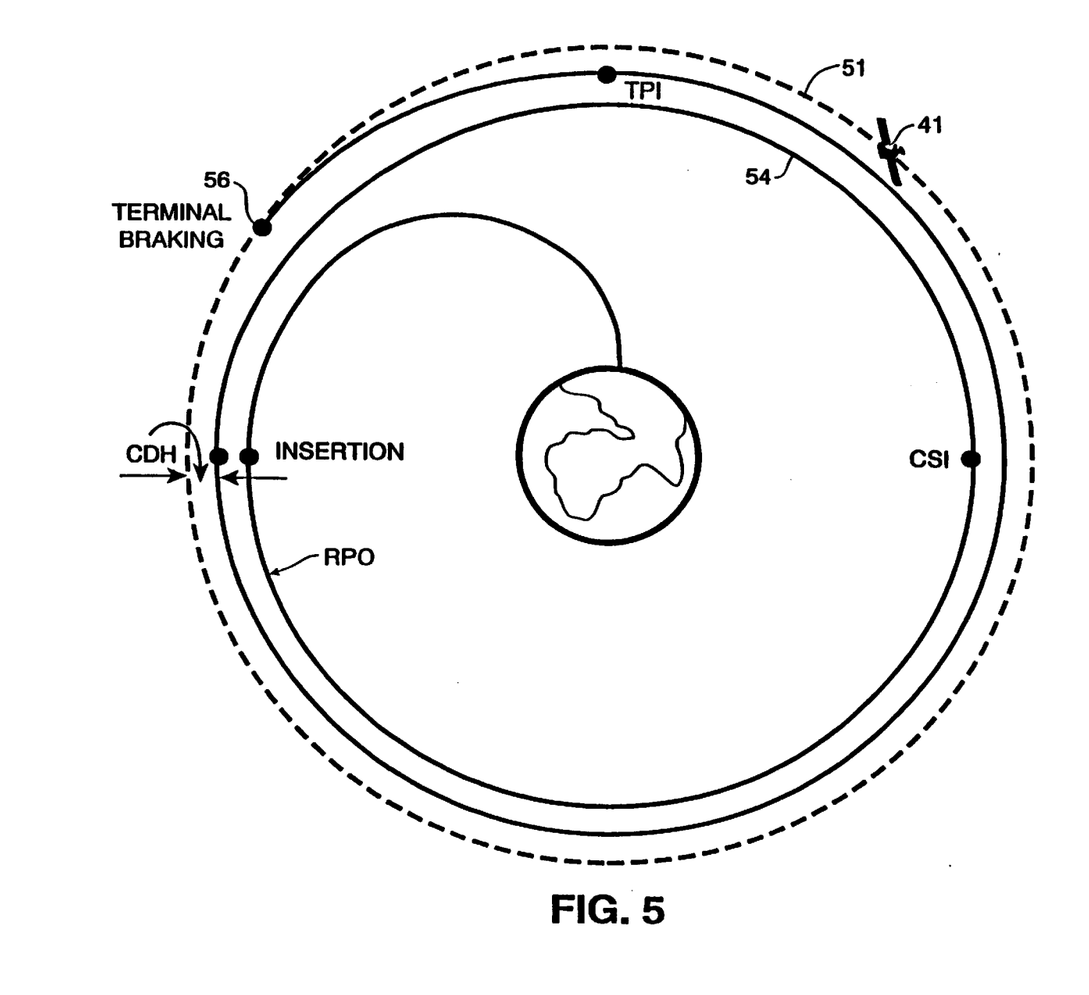
FIGS. 5–7 illustrate a typical mission scenario performed by the apparatus and method of the invention, to transfer a satellite from an unusable orbit to its intended operational orbit and thereafter provide stationkeeping and pointing for the docked combination extension spacecraft-target satellite.
Figure 6:
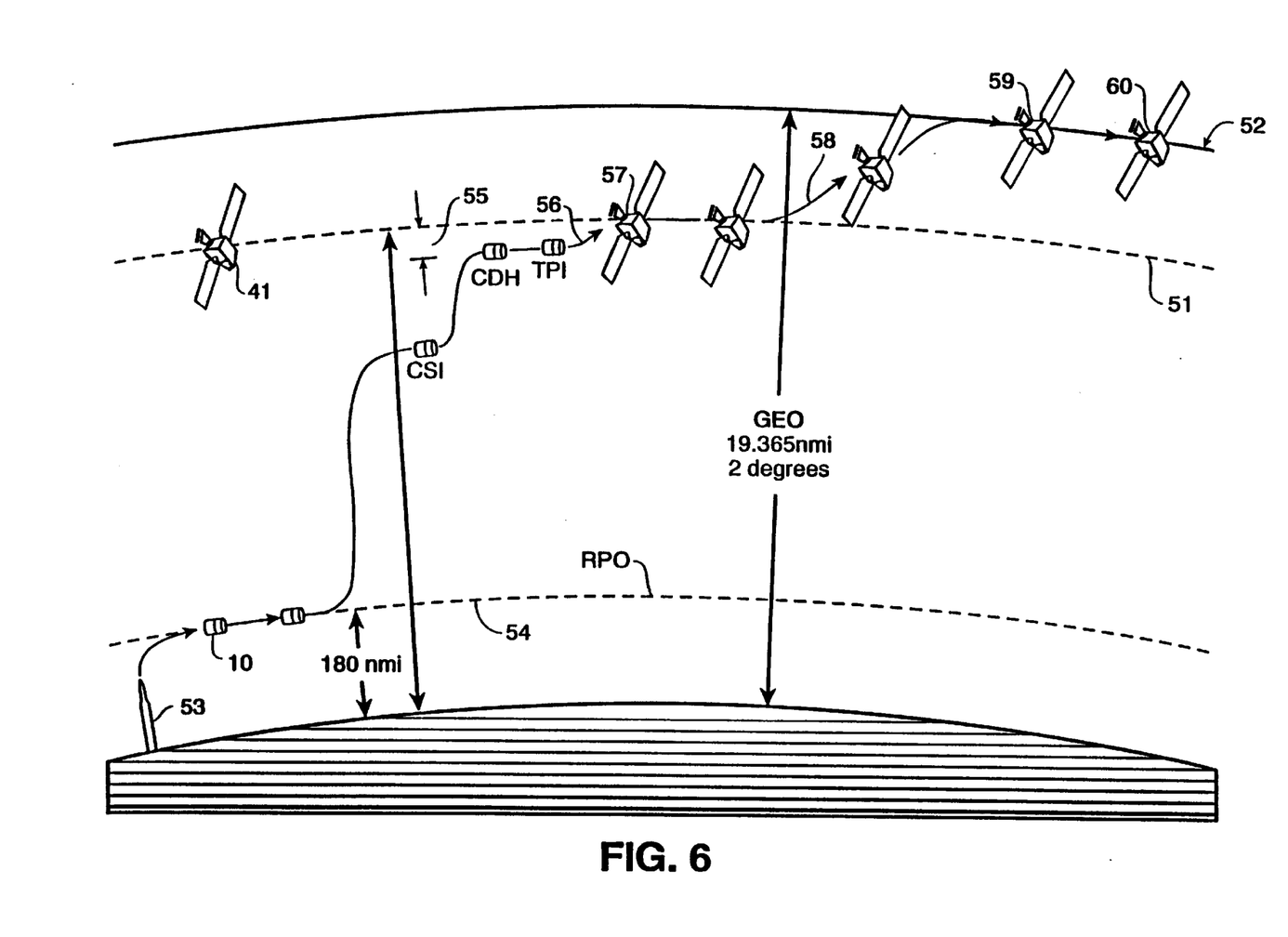
Figure 7:
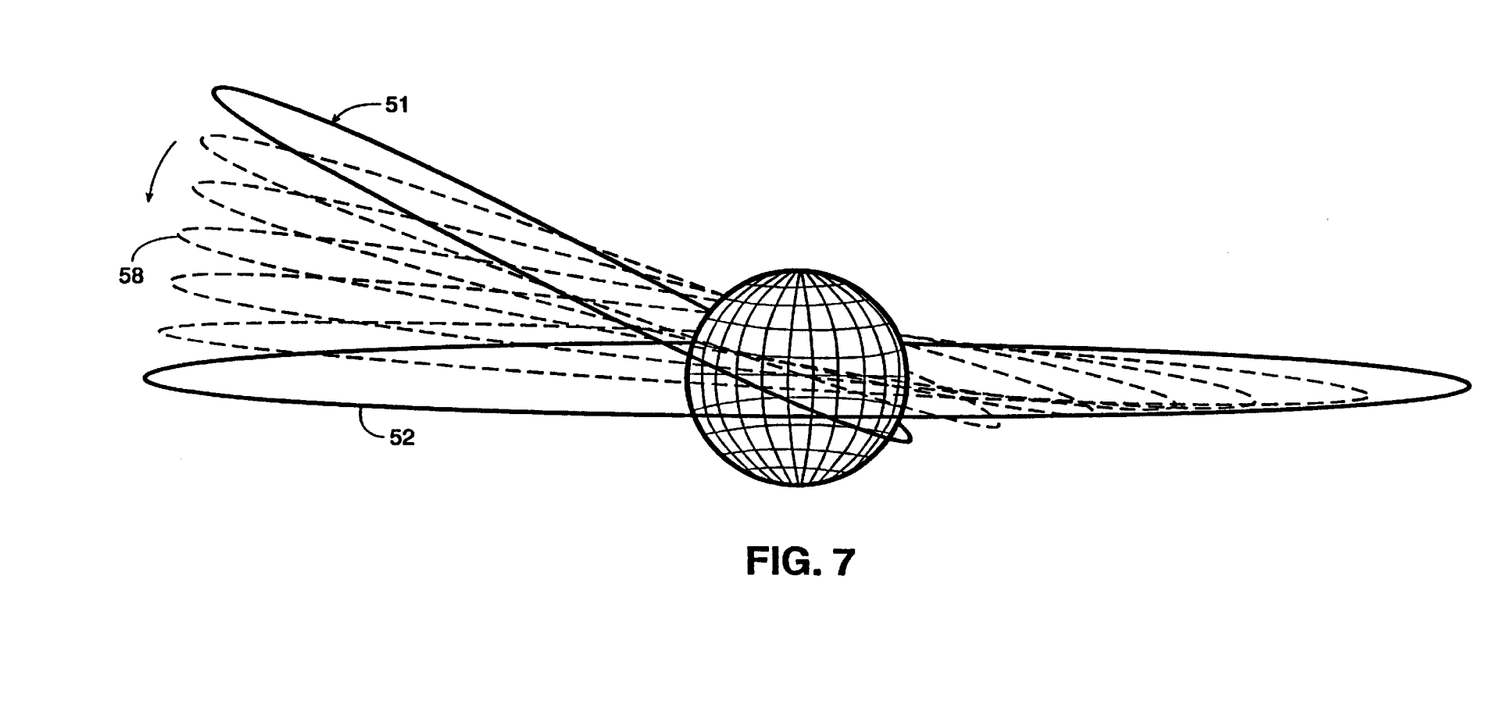

FIGS. 5–7 illustrate a typical mission scenario which can be accomplished by the apparatus and methods of the present invention. Illustratively, this scenario envisions the recovery of the Navy UHF-1 satellite which was launched into a non-operational orbit on Mar. 29, 1993, by a degraded launch vehicle. Subsequently, the Navy stated that the UHF-1 satellite is a total loss. At present, the UHF-1 satellite 41 is in essentially a geosynchronous transfer orbit 51 with a perigee at 118 nm, apogee at 19,365 nm and an inclination at 27 degrees. The recovery flight profile depicted in FIGS. 5–7 is designed to accomplish insertion of the satellite 41 into geostationary orbit (GEO) 52 by circularizing the orbit and reducing its inclination to approximately zero degrees.

To accomplish this mission, the SIRE spacecraft 10 is launched from the Earth by an earth launch vehicle 53, into a Rendezvous Phasing Orbit (RPO) 54 with a perigee of 180 nm, an apogee of approximately 19,345 nm and an inclination of 27 degrees. After insertion of the SIRE spacecraft 10 into RPO, a four-impulse sequence is initiated which consists of coeliptic sequence initiation (CSI), constant delta height (CDH), terminal phase initiation (TPI) and braking. CSI establishes a desired ratio of relative height to phase angle between the SIRE spacecraft 10 and the target satellite 41. CSI also establishes, based on subsequent maneuvers, the standard lighting conditions as well as transfer time for the final approach to the target 41. CDH establishes a constant differential altitude between the SIRE spacecraft 10 and the target satellite. TPI establishes a SIRE spacecraft trajectory that will intercept the target satellite 41 at a specific time and position on the orbit 52 of the target satellite 41. A nominal transfer interval of 130 degrees is used to optimize propellant usage, provide adequate control authority during the final approach, insure the apparent inertial motion of the target satellite 41 (relative to the star field) as near zero during the latter part of the intercept, and insure that the transfer is along the line of sight. Braking is performed as a series of distinct maneuvers performed at specific range/rate "gates", each of which occurs at a range from the target where the actual range/rate is reduced to a preplanned value. The maneuvers at these gates gradually reduce the relative velocity between the vehicles to zero. After docking of the SIRE spacecraft 10 with the target satellite 41, the docked combination 57 then perform a series of maneuvers to raise the perigee of the docked combination 58 through intermediate orbits (indicated by the dash lines on FIG. 7) to raise the perigee to 19,365 nm and reduce the inclination to near zero, placing the docked combination in final operational orbit (GEO) 52.

Of particular importance, in a preferred embodiment of the invention, the method and apparatus include use of a "remote cockpit" which contains a guidance computer, hand controllers and a visual display. As would be understood by those in the art, the remote cockpit may be located anywhere such as the Space Shuttle, Space Station, Mission Control Center, mountain bunker, or even mobile van or ship to provide "remote" control of the SIRE spacecraft. In contrast to a ground station control center typically employed to control a satellite, spacecraft or the like, the remote cockpit is configured substantially similar to the cockpit of an aircraft or spacecraft. In order to overcome the problems of ground station control of a spacecraft which does not provide the intimate control beneficial for a spacecraft performing proximity operations, I provide a remote cockpit including an image monitor, an FDAI (graduated 3-axis "8 ball", analog or digital readouts of downlink inputs from the SIRE, a Rotation Hand Controller ("RHC") and a Translation Hand Controller ("THC"). The image monitor provides a pilot's eye window view from the SIRE spacecraft. The FDAI, similar to the system employed by the Gemini and Apollo programs, provides a centralized inside-out display of the spacecraft attitude, vehicle rates, and attitude errors. More particularly, the FDAI provides attitude (roll—360 degrees, pitch—360 degrees, and yaw—+/–80 degrees) relative to an inertial frame of reference centered on the object satellite at the nominal time the rendezvous braking is completed. Angular rates about each of the three mutually perpendicular spacecraft body axes, role, pitch and yaw are provided to the pilot. Further, the FDAI provides attitude errors of the spacecraft's angular position relative to the inertial reference in all three axes.

To permit the "pilot" to remotely fly the SIRE, the remote cockpit includes analog and digital readouts disclosing: range to the target satellite, range rate to the target satellite, line of sight (LOS) angle of the SIRE spacecraft relative to the target satellite, elapsed time, propellant remaining, and velocity (Delta V) imparted to the SIRE spacecraft as a result of thruster commands along each of the three SIRE body axes.

To control the SIRE spacecraft, the remote cockpit preferably includes a Rotation Hand Controller and a Translation Hand Controller. The Rotation Hand Controller provides three-axis manual body-rate commands for the spacecraft's rotational motion in both directions about the three principal axis proportional to hand controller deflection. The Right Hand Controller is capable of simultaneous multiaxis actuation while attitude hold is established when the Right Hand Controller is placed in neutral. Preferably, the Right Hand Controller also provides emergency angular acceleration commands directly to the RCS jet solenoids by "direct switches" at the limits of the hand controller movement (stops).

The Translation Hand Controller provides manual on/off acceleration control to the thrusters due to on/off response from the Translation Hand Controller along each left/right, up/down, fore/aft hand direction. Accordingly, movement of the Translation Hand Controller results in SIRE spacecraft translation (rectilinear motion) in both directions along each of the principal body axes (X, Y and Z).

Uplink signals from the guidance computer, based on the "control laws" and inputs from the human-operated hand controllers (in response to visual displays generated from spacecraft onboard television cameras and other processed downlink inputs, such as attitude, consumables, caution/warning, etc.) provide teleoperation of the spacecraft during proximity operations, e.g., docking, inspection, etc.

Figure 8:
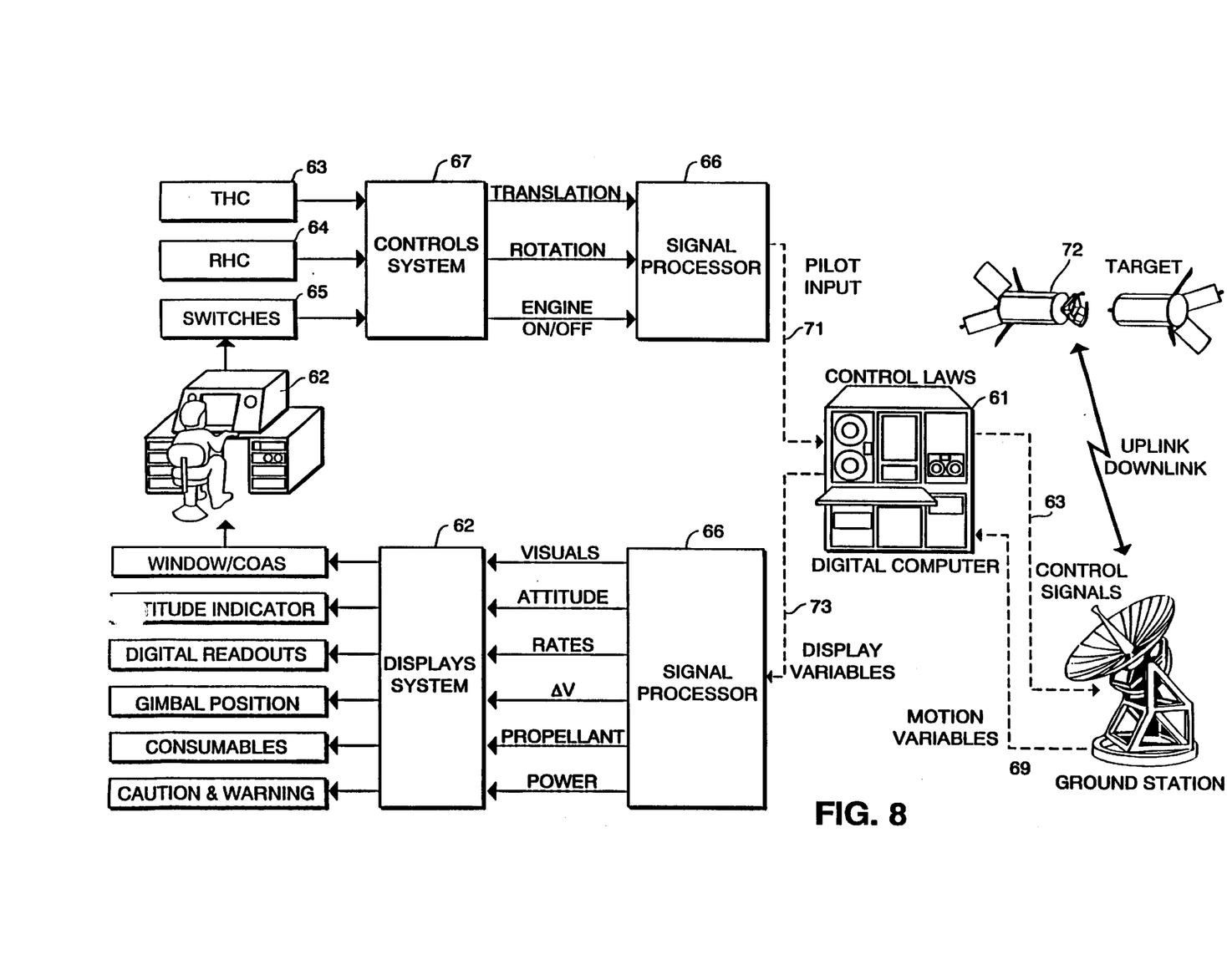
FIGS. 8–9 illustrate a remote cockpit system employed in the preferred embodiment of the invention to provide human control of proximity operations such as docking, inspection, etc.
Figure 9:
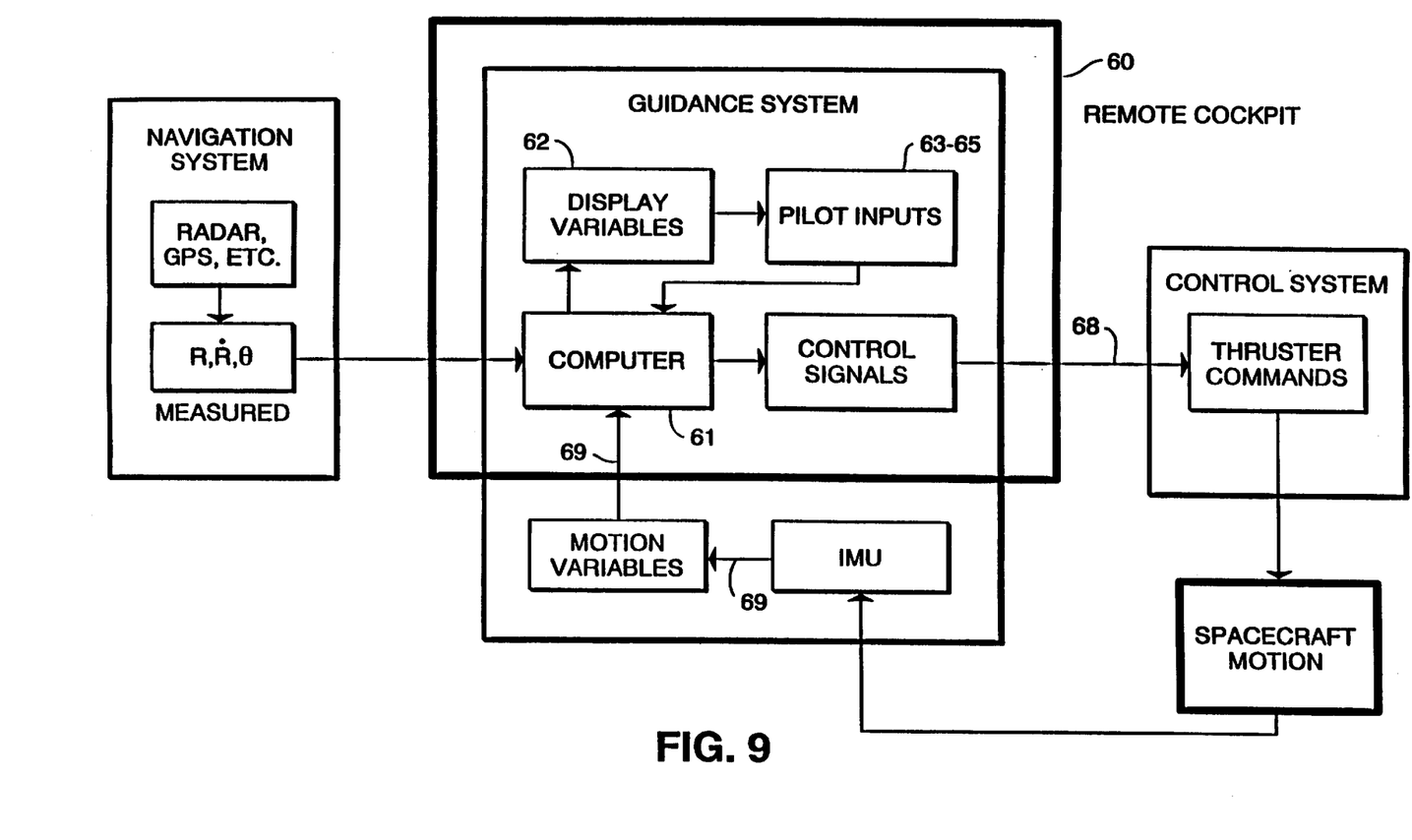

FIGS. 8–9 depict the system and methods of the presently preferred embodiment of the invention, which includes a "remote cockpit" 60 for human control of rendezvous and proximity operations, e.g., inspection and/or docking. The remote cockpit 60, which can be located on the ground or on board another spacecraft, includes the Guidance, Navigation and Control System computer 61 containing the control laws, a controls system 67 and variables display 62. The controls system 67 includes pilot operated translation hand controller 63, rotational hand controller 64, and engine on-off switches 65. Appropriate signal processors 66 are provided to generate the uplinked control signals 68 and downlinked spacecraft motion variables signals 69. Processed control signals 71 ("pilot input") from the controls system 67 and its associated signal processor 66, are uplinked to the spacecraft 72, which, in-turn, provides downlinked motion variables signals 69 to the GNC computer 61 to generate the display variables signals 73 to the signal processor 66 of the displays system 62.

In a preferred embodiment, the present invention includes additional apparatus and methods for closed-loop telepresence, or image processing wherein the movement of the extension spacecraft relative to the target satellite is controlled by uplink signals from human operated hand controllers in a remote cockpit (which includes the guidance computer), in response to visual or image displays generated from spacecraft onboard cameras or the like, to provide teleoperation of the SIRE spacecraft during proximity operations, such as docking, inspection, etc.

To control the SIRE spacecraft in proximity operations, the human operator is provided with a visual image similar to the view from a window or portal of an aircraft or spacecraft. This image is produced by image signals relayed to the remote cockpit from sensors located on the SIRE spacecraft. In a preferred embodiment, the sensors are one or more video cameras which relay video images to the remote cockpit. Additional image producing systems include the use of radar, laser imaging or the like to create a three dimensional image useful for the "pilot" of the SIRE spacecraft for conducting proximity operations.

In a preferred embodiment, the visual image system shows the actual star field background of at least fourth magnitude stars during twilight and darkness in orbit. Providing a visible star field is very important to the pilot's rendezvous capabilities. As a result of the geometry established during the initial part of the rendezvous, the final velocity match of the SIRE spacecraft with the target satellite is achieved by maneuvering directly along the line-of-sight of the SIRE to the target satellite. Proper lighting results in darkness during which nay apparent relative motion of the target against the background star field is nulled by vertical or horizontal translation of the SIRE. The rendezvous geometry enables a straightforward visual/manual thrusting profile using relatively low thrust attitude control thrusters. The primary parameter throughout the rendezvous, particularly during the terminal phase, is the relative motion between the active SIRE spacecraft and the passive target satellite wherein the target satellite appears fixed in space.

When the relative motion of the target satellite against the star field is zero (up/down and left/right), the pilot is on the proper intercept trajectory with the target. As an example, is the target moves up relative to the star field, the pilot will thrust "up" with the Translation Hand Controller to null the relative motion between the SIRE and the target satellite and gain on the intercept trajectory. During this process, and using the FDAI, the pilot maintains a fixed spacecraft attitude with the Right Hand Controller. The pilot with his eyes and brain processor is essential to these maneuvers, and accordingly, as is the need for a window (visual image showing stars), and hand controllers.

In an additional embodiment, the imaging system of the present invention includes a Geometrical Pattern Recognition System ("GPRS"). In operation, the GPRS functions substantially similar to the Apollo "COAS"/"stand-off cross" target system. For more detail regarding the Apollo "COAS"/"stand-off cross" target system, refer to the *Apollo Experience Report—"Crew Provisions and Equipment Subsystem"* McAllister, F. A., NASA/MSC, March 1972, which is incorporated herein by reference. By means of the GPRS, when approaching the target satellite to perform proximity operations, such as docking, the pilot in the remote cockpit is presented with two computer generated 3-dimensional perspective geometrical line patterns (figures) of the target satellite, the first being a representation of the target's current (real-time) position, and the second being a representation of the target satellite at the point (time) of initial contact with the SIRE spacecraft. The real-time target represents the actual precise geometrical orientation of the target satellite relative to the pilot's eyes as the target appears to move to the point of initial contact. The point (time) of contact target represents the required precise geometrical orientation of the target satellite relative to the pilot's eyes at the time (point) of initial contact between the two vehicles. In this manner, although the SIRE is actually moving relative to the target satellite, the frame of reference is fixed at the pilot's eyes.

For the SIRE to successfully capture the target (dock), the two patterns must be superimposed at the time/point of initial contact, or a zero relative distance between the SIRE and the target satellite. The relative position and orientation of the target is available continuously from the vectors of the two vehicles.

In an additional embodiment, the GPRS provides a third image to the pilot's eyes, a "nominal target". The nominal target is the nominal (planned) geometrical orientation of the target spacecraft as the target moves to the point of initial contact. Preferably, this image can be tuned on and off to allow the pilot to superimpose the nominal location and the orientation of the target satellite at any given time between the beginning of the approach until SIRE and satellite engagement. To further facilitate pattern recognition, each of the three images (point (time) of contact, real-time target and nominal target) is presented in a different color or represented by a different line type, e.g., short dashes or dots.

Having described by invention in such terms as to enable those skilled in the art to understand and practice it, workers skilled in the art will recognize that changes may be made in form and detail without departing from the spirit and scope of the invention,

I claim:

1. A method of performing in-space proximity operations, said method comprising:
    (a) moving an extension spacecraft to within proximity of an orbiting target satellite;
    (b) mechanically connecting said extension spacecraft to said target satellite to form a docked satellite-spacecraft combination, said extension spacecraft including,
        (i) guidance, navigation and control systems for position control of said extension spacecraft and said docked satellite-spacecraft combination, and
        (ii) an onboard propellant supply for extending the life of said target satellite; and
    (c) continuously activating said guidance, navigation and control systems of said extension spacecraft to extend the life of said target satellite.

2. A method of performing in-space proximity operations, said method comprising:
    (a) moving an extension spacecraft to within proximity of an orbiting target satellite which has been unintentionally positioned in an unintended orbit;

(b) mechanically connecting said extension spacecraft to said target satellite to form a docked satellite-spacecraft combination, said extension spacecraft including,
  (i) guidance, navigation and control systems for position control of said extension spacecraft and said docked satellite-spacecraft combination, and
  (ii) an onboard propellant supply for adjusting the life of said target satellite;
(c) activating said guidance, navigation and control systems of said extension spacecraft to move said satellite-spacecraft combination from an unintended orbit to a second orbit; and
(d) operating said target satellite in said second orbit.

3. The method of performing in-space proximity operations of claim 2 further comprising the step:
  extending the life of said target satellite by continued activation of said guidance, navigation and control systems of said extension spacecraft.

4. A method of performing in-space proximity operations, said method comprising:
  (a) moving an extension spacecraft to within proximity of an orbiting target satellite;
  (b) mechanically connecting said extension spacecraft to said target satellite to form a docked satellite-spacecraft combination, said extension spacecraft including,
    stabilization means for providing stabilization control of said docked satellite-spacecraft combination; and
  (c) continuously activating said stabilization means to control the stabilization of said satellite-spacecraft combination to extend the life of said target satellite.

5. A method of performing in-space proximity operations, said method comprising:
  (a) moving an extension spacecraft to within proximity of an orbiting target satellite;
  (b) mechanically connecting said extension spacecraft to said target satellite to form a docked satellite-spacecraft combination, said extension spacecraft including,
    a satellite subsystem; and
  (c) activating said satellite subsystem to permit continued use of said satellite.

* * * * *